(No Model.)
W. KRATZER.
ANTI FRICTION WHEEL OR ROLLER.
No. 320,366. Patented June 16, 1885.
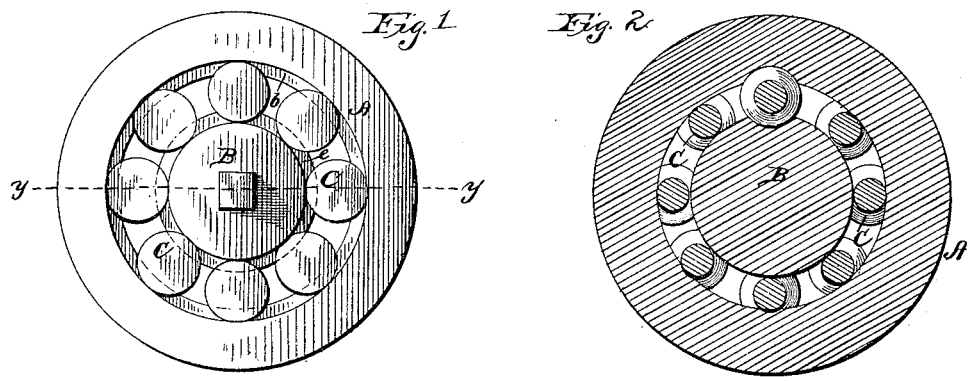
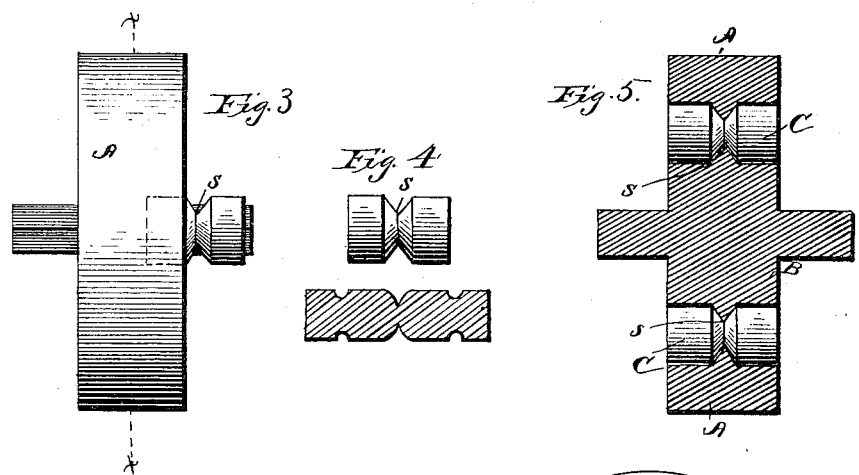
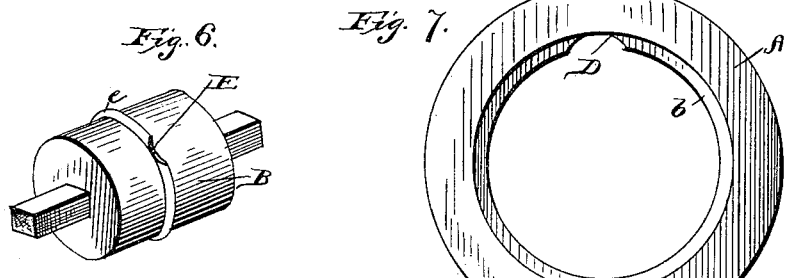
WITNESSES
John Enders Jr.
F. R. Harding
INVENTOR
Wayne Kratzer
O. E. Duffy
Attorney

UNITED STATES PATENT OFFICE.

WAYNE KRATZER, OF ALLENTOWN, ASSIGNOR OF TWO-THIRDS TO CHARLES ZIEGENFUS AND F. A. S. HELVERSON, BOTH OF LEHIGH COUNTY, PENNSYLVANIA.

ANTI-FRICTION WHEEL OR ROLLER.

SPECIFICATION forming part of Letters Patent No. 320,366, dated June 16, 1885.

Application filed April 21, 1885. (No model.)

*To all whom it may concern:*

Be it known that I, WAYNE KRATZER, of Allentown, in the county of Lehigh and State of Pennsylvania, have invented certain new and useful Improvements in Anti-Friction Wheels and Rollers; and I do hereby declare that the following is a full, clear, and exact description of the invention, which will enable others skilled in the art to which it appertains to make and use the same, reference being had to the accompanying drawings, and to letters of reference marked thereon, which form part of this specification.

The object of my invention is to provide an anti-friction roller or wheel having improved means of inserting the rolls between the shaft and tread, the same being held in position by means of the circular tongue-shaped projections upon the shaft and tread, one being upon the outward periphery of the shaft and the other upon the inner circular surface of the tread or rim. Each one of the tongue-shaped projections is constructed with a semi-circular recess upon some point of its surface, as shown in the accompanying drawings, to facilitate the insertion and removal of the rolls without the trouble and loss of time as heretofore. The rolls are provided in their central surfaces with angular or V-shaped grooves, for the purpose of registering with the circular tongue-shaped projections upon the shaft and tread while in operation, the rolls not being in sections, but made in one whole piece.

In the accompanying drawings, Figure 1 represents a front or face view of my improved anti-friction roller or wheel. Fig. 2 is a sectional view of the wheel, taken on line $xx$ of Fig. 5. Fig. 3 is a view of the wheel with one of its rolls in position to be inserted. Fig. 4 is a detail view of one of the anti-friction rolls, which may be single or double. Fig. 5 is a central vertical section of the wheel, taken on line $yy$ of Fig. 1. Fig. 6 is a perspective view of the shaft, showing the circular tongue-shaped projection upon its periphery and the semicircular recess in said tongue. Fig. 7 is a detail view of the tread or rim, showing upon its inner circular surface the circular tongue-shaped projection and recess therein corresponding with the projection and recess in Fig. 6.

A in the drawings represents the tread or rim of the wheel, which rests upon the anti-friction rolls C, said rolls bearing upon the shaft B. $e$ represents the circular tongue-shaped projection upon the shaft B; and $b$ represents a corresponding circular tongue-shaped projection upon the inner surface of the tread or rim A, as represented in the Figs. 6 and 7. The shaft B, provided with the tongue-shaped projection $e$, which is recessed at E, registers with a similar recess, D, in the tongue $b$ on the inner surface of the tread or rim A, as shown in Fig. 1, to facilitate the insertion and removal of the anti-friction rolls C, which are also provided with the angular grooves $s$, which register with the tongue $e$ on the shaft and on the inner surface of the tread.

It is obvious that by providing the tongue on the shaft with a recess on a curve which corresponds to the grooves or curves upon the the anti-friction rolls, and also by providing the tongue $b$ on the tread A with a similar recess, the rolls may be made in a solid piece and put in without being separated. It is also obvious that the rolls might be provided with a tongue and the tread and shaft be correspondingly recessed without departing from the spirit of my invention.

The manner of putting the parts together is as follows: The shaft or hub is first inserted in the rim or tread, having the recesses E and D directly opposite to each other. One of the anti-friction rolls is then inserted and rolled to either side of the recess, then another roll is inserted in like manner and rolled away from the recess, and so on until all are in position. Either the rim or axle is now turned so that the recesses are no longer opposite to each other, and thus the rolls are retained in their position.

Heretofore anti-friction rollers have been made in sections for the insertion of the rolls, which, when they in any way become loose or worn, make much noise, and afterward become so loose that they have to be thrown away. With my improved construction all the parts are solid and interchangeable, so that when any part is worn another can be substituted.

It is obvious that these may be of any size or shape; that they are capable of many adaptations and many uses when frictional contact is to be overcome.

It is well known that much of the motive power of any motor is lost by frictional contact even when the journals or bearings are well lubricated, and lubricants are a very heavy expense; but with my anti-friction roller I not only economize power, but also a great saving in lubricants.

My invention is simple in construction, cheap in first cost, easy of repair, and durable in operation, and particularly applicable to journal-bearings.

Having thus described the construction and operation of my invention, what I claim as new and desire to secure by Letters Patent is—

The combination, in an anti-friction roller-wheel, of the outer rim or tread, A, having a tongue projection on its inner circular surface, a shaft or hub having a corresponding projection or tongue upon its periphery, said projection or tongue having a part of it cut away to form a recess for the insertion of the rolls, substantially as described.

In testimony that I claim the foregoing as my own I affix my signature in presence of two witnesses.

WAYNE KRATZER.

Witnesses:
T. M. ELY,
SAMUEL P. SWARTZ.